(12) United States Patent
Utsuki et al.

(10) Patent No.: US 11,387,444 B2
(45) Date of Patent: Jul. 12, 2022

(54) ELECTRODE, INSULATING LAYER APPLICATION LIQUID, METHOD FOR MANUFACTURING ELECTRODE, NONAQUEOUS POWER STORAGE ELEMENT, AND ELECTRONIC DEVICE

(71) Applicant: RICOH COMPANY, LTD., Tokyo (JP)

(72) Inventors: Aya Utsuki, Tokyo (JP); Masahiro Masuzawa, Kanagawa (JP); Kohji Matsuoka, Kanagawa (JP); Yuu Zama, Kanagawa (JP); Anna Hirowatari, Kanagawa (JP); Hideo Yanagita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 389 days.

(21) Appl. No.: 16/354,226

(22) Filed: Mar. 15, 2019

(65) Prior Publication Data

US 2019/0288276 A1 Sep. 19, 2019

(30) Foreign Application Priority Data

Mar. 16, 2018 (JP) .............................. JP2018-049455
Nov. 30, 2018 (JP) .............................. JP2018-224519

(51) Int. Cl.
*H01M 10/058* (2010.01)
*H01M 4/139* (2010.01)
(Continued)

(52) U.S. Cl.
CPC ........... *H01M 4/139* (2013.01); *H01M 4/621* (2013.01); *H01M 10/058* (2013.01); *H01M 10/0525* (2013.01); *H01M 10/4235* (2013.01)

(58) Field of Classification Search
CPC ........ H01M 4/62; H01M 4/621; H01M 4/622; H01M 4/364; H01M 4/366;
(Continued)

(56) References Cited

U.S. PATENT DOCUMENTS 10,038,193 B1 * 7/2018 Schroder ................ H01G 11/26
10,381,690 B2 * 8/2019 Nam .................. H01M 10/0525
(Continued)

FOREIGN PATENT DOCUMENTS

CN 102511105 6/2012
CN 103311550 9/2013
(Continued)

OTHER PUBLICATIONS

Chinese Office Action dated Dec. 31, 2021 in Chinese Application No. 201910187670.1, 7 pages.

*Primary Examiner* — Stephen J Yanchuk
(74) *Attorney, Agent, or Firm* — Grüneberg and Myers PLLC (57) ABSTRACT

An electrode is provided which includes an electrode substrate, an electrode mixture layer overlying the electrode substrate, and an insulating layer overlying the electrode mixture layer. The electrode mixture layer contains an active material and a void. The insulating layer contains a resin and an insulating inorganic particulate accounting for 80% by mass of the insulating layer. In a boundary region of the electrode mixture layer with the insulating layer, the resin and the insulating inorganic particulate are present in a part of the void.

18 Claims, 3 Drawing Sheets

(51) Int. Cl.
*H01M 10/0525* (2010.01)
*H01M 4/62* (2006.01)
*H01M 10/42* (2006.01)

(58) Field of Classification Search
CPC .. H01M 10/4235; H01M 4/133; H01M 4/134;
H01M 4/139; H01M 10/058
See application file for complete search history.

(56) References Cited

U.S. PATENT DOCUMENTS

2018/0261827 A1    9/2018   Yanagita et al.
2019/0088921 A1*   3/2019   Umehara ............ H01M 4/1393

FOREIGN PATENT DOCUMENTS

| | | |
|---|---|---|
| CN | 103855358 | 6/2014 |
| CN | 105914323 | 8/2016 |
| JP | 8-078748 | 3/1996 |
| WO | WO2013/136426 A1 | 9/2013 |

* cited by examiner

ELECTRODE, INSULATING LAYER APPLICATION LIQUID, METHOD FOR MANUFACTURING ELECTRODE, NONAQUEOUS POWER STORAGE ELEMENT, AND ELECTRONIC DEVICE

CROSS-REFERENCE TO RELATED APPLICATIONS

This patent application is based on and claims priority pursuant to 35 U.S.C. § 119(a) to Japanese Patent Application Nos. 2018-049455 and 2018-224519, filed on Mar. 16, 2018 and Nov. 30, 2018, respectively, in the Japan Patent Office, the entire disclosure of each of which is hereby incorporated by reference herein.

BACKGROUND

Technical Field

The present disclosure relates to an electrode, an insulating layer application liquid, a method for manufacturing electrode, a nonaqueous power storage element, and an electronic device.

Description of the Related Art

Demands for nonaqueous power storage elements, such as lithium ion secondary batteries, with higher output, higher capacity, and longer life are rapidly increasing.

However, there are various problems relating to the safety of nonaqueous power storage elements in realizing higher output, higher capacity, and longer life.

For example, when a cathode and an anode are short-circuited and heat is generated instantaneously, a separator disposed between the cathode and the anode is thereby melted and the short-circuited portion is expanded, resulting in abnormal heat generation.

Therefore, it is desired that heat generation is reduced when the cathode and the anode are short-circuited.

SUMMARY

In accordance with some embodiments of the present invention, an electrode is provided. The electrode includes an electrode substrate, an electrode mixture layer overlying the electrode substrate, and an insulating layer overlying the electrode mixture layer. The electrode mixture layer contains an active material and a void. The insulating layer contains a resin and an insulating inorganic particulate accounting for 80% by mass of the insulating layer. In a boundary region of the electrode mixture layer with the insulating layer, the resin and the insulating inorganic particulate are present in a part of the void.

In accordance with some embodiments of the present invention, an insulating layer application liquid is provided. The insulating layer application liquid contains an insulating inorganic particulate accounting for 20% to 60% by mass of the insulating layer application liquid, a resin, and an organic solvent having a boiling point of from 140 to 300 degrees C., and has a viscosity of from 5 to 20 mPa·s at 25 degrees C.

In accordance with some embodiments of the present invention, a method for manufacturing electrode is provided. The method includes the processes of: forming an electrode mixture layer on an electrode substrate, where the electrode mixture layer contains an active material and a void; and applying the above-described insulating layer application liquid onto the electrode mixture layer to form an insulating layer.

In accordance with some embodiments of the present invention, a nonaqueous power storage element comprising the above-described electrode is provided.

In accordance with some embodiments of the present invention, an electronic device comprising the above-described nonaqueous power storage element is provided.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Within the context of the present disclosure, if a first layer is stated to be "overlaid" on, or "overlying" a second layer, the first layer may be in direct contact with a portion or all of the second layer, or there may be one or more intervening layers between the first and second layer, with the second layer being closer to the substrate than the first layer.

A nonaqueous electrolyte secondary battery has been proposed which includes a cathode having a mixture layer containing a cathode active material, an anode having a mixture layer containing an anode active material, and a nonaqueous electrolyte. Here, in the cathode and/or the anode, a porous insulating layer is formed on the mixture layer. The porous insulating layer contains a resin having a cross-linked structure and an inorganic particulate. At the interface between the porous insulating layer and the mixture layer, a mixed layer containing a component of the insulating layer and a component of the mixture layer is provided. Further, a porous resin layer containing a heat-fusible resin having a melting point of from 100 to 170 degrees C. is formed on the surface of the insulating layer of the electrode provided with the insulating layer and/or the surface of the mixture layer of the electrode provided with no insulating layer.

However, in order to impart a function as a separator to the porous insulating layer, the content of the resin having a cross-linked structure is large. As a result, in a case in which the softening point of the resin having a cross-linked structure is low, when the cathode and the anode are short-circuited, the resin having a cross-linked structure is melted and thus heat generation is not reduced.

According to an embodiment of the present invention, an electrode is provided that is capable of suppressing heat generation when a cathode and an anode are short-circuited.

Figure 1:
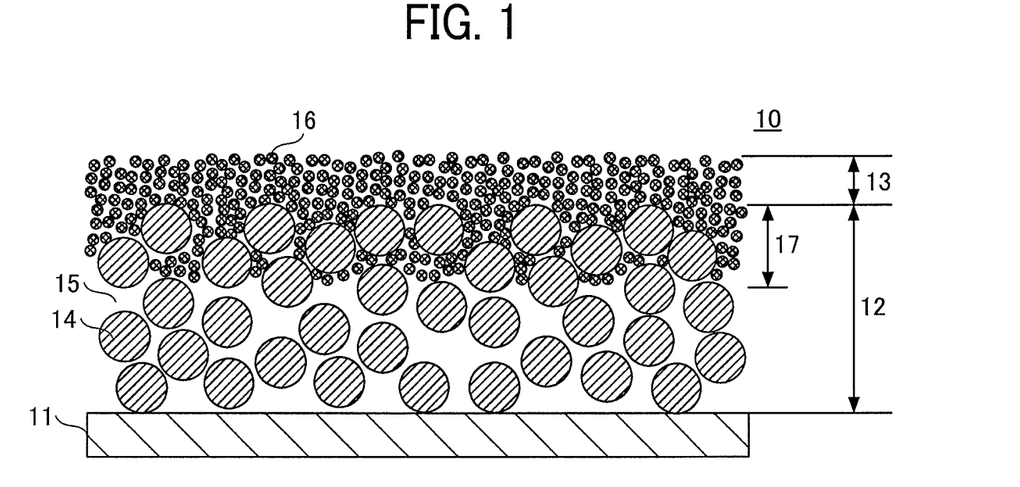
FIG. 1 is a schematic cross-sectional view of an electrode according to an embodiment of the present invention.

FIG. 1 is a schematic cross-sectional view of an electrode according to an embodiment of the present invention.

An electrode 10 includes an electrode substrate 11, an electrode mixture layer 12 overlying the electrode substrate 11, and an insulating layer 13 overlying the electrode mixture layer 12. The electrode mixture layer 12 contains an active material 14, and a void 15 is present in the electrode mixture layer 12. The insulating layer 13 contains an insulating inorganic particulate 16 and a resin 21 (see FIG. 2). The resin 21 is present between the active material 14 and the insulating inorganic particulate 16 and between the particles of the insulating inorganic particulate 16.

In the electrode 10, in a boundary region 17 of the electrode mixture layer 12 with the insulating layer 13, the insulating inorganic particulate 16 and the resin 21 are present in a part of the void 15. This configuration improves the bonding strength between the electrode mixture layer 12 and the insulating layer 13, so that the content of the resin in the insulating layer 13 can be reduced.

Here, the insulating layer 13 refers to a region not including the boundary region 17 of the electrode mixture layer 12 with the insulating layer 13, that is, a region not including the active material 14.

The content of the insulating inorganic particulate 16 in the insulating layer 13 is 80% by mass or more. When the content of the insulating inorganic particulate 16 in the insulating layer 13 is less than 80% by mass, it is impossible to suppress heat generation when the cathode and the anode are short-circuited. The content of the insulating inorganic particulate 16 in the insulating layer 13 is typically 99% by mass or less.

The content of the insulating inorganic particulate 16 in the insulating layer 13 can be determined by observing a cross section of the insulating layer 13 with a scanning electron microscope (SEM) and identifying the insulating inorganic particulate 16 by X-ray diffractometry.

Electrode Substrate

The material constituting the electrode substrate 11 is not particularly limited as long as it has conductivity and can be appropriately selected according to the purpose. Examples thereof include, but are not limited to, stainless steel, nickel, aluminum, copper, titanium, and tantalum. Among these, stainless steel, copper, and aluminum are preferable.

The shape and size of the electrode substrate 11 are not particularly limited and can be appropriately selected according to the purpose.

Electrode Mixture Layer

The electrode mixture layer 12 (anode mixture layer or cathode mixture layer) is not particularly limited as long as it contains the active material 14 (anode active material or cathode active material) and the void 15 is present therein and can be appropriately selected depending on the purpose.

The average thickness of the electrode mixture layer 12 is not particularly limited and can be appropriately selected according to the purpose.

The average thickness of the cathode mixture layer is preferably from 10 to 300 µm, and more preferably from 40 to 150 µm. When the average thickness of the cathode mixture layer is 20 µm or more, energy density of the nonaqueous power storage element is improved. When the average thickness is 300 µm or less, load characteristic of the nonaqueous power storage element is improved.

The average thickness of the anode mixture layer is preferably from 10 to 450 µm, and more preferably from 10 to 150 µm. When the average thickness of the anode mixture layer is 10 µm or more, energy density of the nonaqueous power storage element is improved. When the average thickness is 450 µm or less, cycle characteristics of the nonaqueous power storage element is improved.

The electrode mixture layer 12 may be formed by, for example, applying an application liquid in which the active material 14 is dispersed in a dispersion medium, or an application liquid prepared by kneading a composition containing the active material 14 and a dispersion medium, onto the electrode substrate 11, followed by drying and pressing with a force of about 100 kN.

Examples of the dispersion medium include, but are not limited to, N-methylpyrrolidone, dimethylsulfoxide, 2-pyrrolidone, and water.

Active Material

The material constituting the active material 14 is not particularly limited as long as it is capable of reversibly occluding and releasing alkali metal ions such as lithium ion and can be appropriately selected according to the purpose.

As the cathode active material, an alkali-metal-containing transition metal compound can be used.

Examples of the alkali-metal-containing transition metal compound include, but are not limited to, a lithium nickel composite oxide having a basic backbone of a compound represented by the general formula $LiNi_xCo_yMn_zO_2$ (where the formula x+y+z=1 is satisfied) and a lithium phosphate material having a basic backbone of a compound represented by the general formula $Li_xM_y(PO_4)_z$ (where M represents a transition metal and the formulae $0.5 \leq x \leq 4$, $0.5 \leq y \leq 2.5$, and $0.5 \leq z \leq 3.5$ are satisfied).

Specific examples of the basic backbone of the lithium nickel composite oxide include, but are not limited to, $LiNi_{0.33}Co_{0.33}Mn_{0.33}O_2$, $LiNi_{0.5}Co_{0.2}Mn_{0.3}O_2$, $LiNi_{0.6}Co_{0.2}Mn_{0.2}O_2$, and $LiNi_{0.5}Co_{0.2}O_2$.

Specific examples of the basic backbone of the lithium phosphate material include, but are not limited to, lithium vanadium phosphate ($Li_3V_2(PO_4)_3$), olivine iron ($LiFePO_4$), olivine manganese ($LiMnPO_4$), olivine cobalt ($LiCoPO_4$), olivine nickel ($LiNiPO_4$), and olivine vanadium ($LiVOPO_4$).

As the alkali-metal-containing transition metal compound, an analogous compound obtained by doping a hetero element to the basic backbone thereof can also be used.

As the anode active material, a carbonaceous material can be used.

Examples of the carbonaceous material include, but are not limited to, coke, graphites such as synthetic graphite and natural graphite, thermal decomposition products of organic matter under various thermal decomposition conditions, and amorphous carbon. Of these, synthetic graphite, natural graphite, and amorphous carbon are particularly preferable.

Resin and Conducting Agent

The electrode mixture layer 12 may further contain a resin, a conducting agent, and the like, if necessary.

Examples of the resin include, but are not limited to: polymers such as polyvinylidene fluoride (PVDF), polyvinylpyrrolidone (PVP), polytetrafluoroethylene (PTFE), polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, and carboxymethyl cellulose; and analogous compounds having a backbone similar to those of these polymers.

Examples of the resin further include copolymers of monomers such as tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

Examples of the resin further include dispersants (surfactants) such as MEGAFACE (available from DIC Corporation), MALIALIM (available from NOF CORPORATION), ESLEAM (available from NOF CORPORATION), SOLSPERSE (available from The Lubrizol Corporation), POLYFLOW (available from Kyoeisha Chemical Co., Ltd.), and BYK-DISPER (available from BYK Additives & Instruments).

Each of these resins may be used alone or in combination with others.

Examples of the conducting agent include, but are not limited to, graphites such as natural graphite and synthetic graphite; carbon blacks such as acetylene black, Ketjen black, channel black, furnace black, lamp black, and thermal black; conductive fibers such as carbon fibers and metal fibers; powders of metals such as carbon fluoride and aluminum; conductive whiskers such as zinc oxide and potassium titanate; conductive metal oxides such as titanium oxide; and organic conductive materials such as phenylene derivatives and graphene derivatives.

Insulating Layer

The thickness of the insulating layer 13, that is, the distance from the surface of the electrode mixture layer 12 to the surface of the insulating layer 13 is preferably from 0.3 to 20 μm. When the thickness of the insulating layer 13 is 0.3 μm or more, heat generation is more reduced when the cathode and the anode are short-circuited. When the thickness is 20 μm or less, the electrode 10 can be thinned.

Insulating Inorganic Particulate

The material constituting the insulating inorganic particulate 16 is not particularly limited and may be appropriately selected. Examples thereof include, but are not limited to, metal oxides, metal nitrides, metal compounds other than metal oxides and metal nitrides, and glass ceramics.

Each of these insulating inorganic particulates 16 may be used alone or in combination with others.

Examples of the metal oxides include, but are not limited to, $Al_2O_3$ (alumina), $TiO_2$, $BaTiO_3$, and $ZrO_2$.

Examples of the metal nitrides include, but are not limited to, aluminum nitride and silicon nitride.

Examples of the metal compounds other than metal oxides and metal nitrides include, but are not limited to, poorly-soluble ionic crystals such as aluminum fluoride, calcium fluoride, barium fluoride, and barium sulfate; and substances derived from mineral resources such as boehmite, zeolite, apatite, kaolin, mullite, spinel, olivine, sericite, and bentonite, and artifacts thereof.

Examples of the glass ceramics include, but are not limited to, crystallized glass ceramics using $ZnO$—$MgO$—$Al_2O_3$—$SiO_2$-based crystallized glass, and non-glass ceramics using $BaO$—$Al_2O_3$—$SiO_2$-based ceramic or $Al_2O_3$—$CaO$—$SiO_2$—$MgO$—$B_2O_3$-based ceramic.

The average particle diameter of the insulating inorganic particulate 16 is not particularly limited and may be appropriately selected according to the size of the void 15 of the electrode mixture layer 12, but it is preferably 10 μm or less, more preferably 3 μm or less.

Resin

Figure 2:
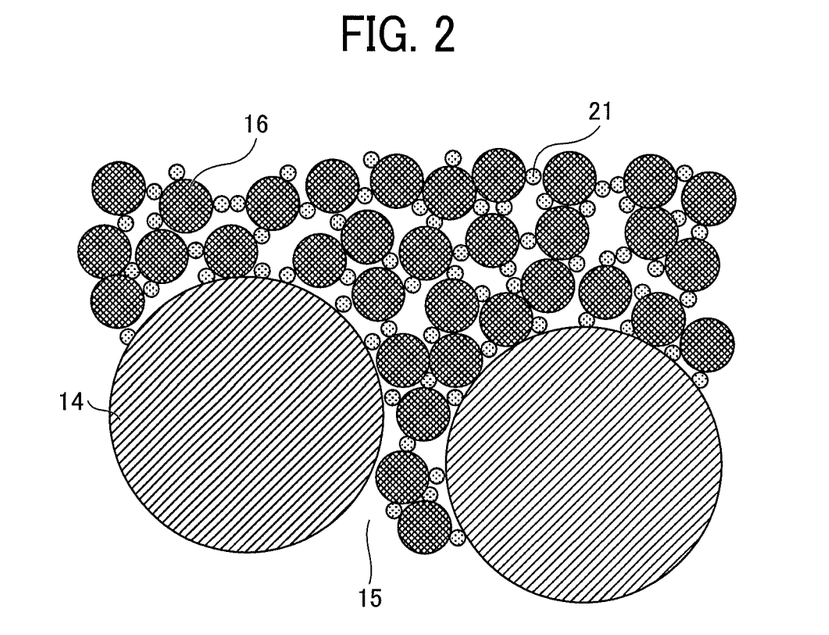
FIG. 2 is a partial magnified view of the electrode illustrated in FIG. 1.

The material constituting the resin 21 is not particularly limited and may be appropriately selected. Examples thereof include, but are not limited to, polymers such as an inorganic resin containing at least one element selected from the group consisting of silicon, aluminum, and zirconium, phenol resin, acrylic resin, polyimide, epoxy resin, melamine resin, fluororesin, and styrene butadiene rubber.

Examples of the material constituting the resin 21 further include dispersants (surfactants) such as MEGAFACE (available from DIC Corporation), MALIALIM (available from NOF CORPORATION), ESLEAM (available from NOF CORPORATION), SOLSPERSE (available from The Lubrizol Corporation), POLYFLOW (available from Kyoeisha Chemical Co., Ltd.), and BYK-DISPER (available from BYK Additives & Instruments).

Each of these resins 21 may be used alone or in combination with others.

The content of the resin 21 in the insulating layer 13 is not particularly limited and may be appropriately selected depending on the content and surface area of the insulating inorganic particulate 16, but is preferably from 0.1% to 10% by mass. When the content of the resin 21 in the insulating layer 13 is 0.1% by mass or more, the bonding strength between the electrode mixture layer 12 and the insulating layer 13 is improved. Even when the content of the resin 21 in the insulating layer 13 is 10% by mass or more, the bonding strength between the electrode mixture layer 12 and the insulating layer 13 is saturated.

Insulating Layer Application Liquid

The insulating layer application liquid according to an embodiment of the present invention is used for forming the insulating layer 13, and contains the insulating inorganic particulate 16, the resin 21, and an organic solvent.

The viscosity of the insulating layer application liquid is from 5 to 20 mPa·s, preferably from 8 to 12 mPa·s, at 25 degrees C. When the viscosity of the insulating layer application liquid is less than 5 mPa·s at 25 degrees C., the insulating layer application liquid excessively permeates into the void 15 of the electrode mixture layer 12 and the void ratio of the electrode mixture layer 12 decreases. When the viscosity of the insulating layer application liquid is larger than 20 mPa·s at 25 degrees C., the insulating layer application liquid is not able to sufficiently permeates into the void 15 of the electrode mixture layer 12 and the bonding strength between the electrode mixture layer 12 and the insulating layer 13 decreases.

The content of the insulating inorganic particulate 16 in the insulating layer application liquid is from 20% to 60% by mass. When the content of the insulating inorganic particulate 16 in the insulating layer application liquid is less than 20% by mass, the insulating layer application liquid excessively permeates into the void 15 of the electrode mixture layer 12 and the void ratio of the electrode mixture layer 12 decreases. When the content of the insulating inorganic particulate 16 in the insulating layer application liquid is larger than 60% by mass, the insulating layer application liquid is not able to sufficiently permeates into the void 15 of the electrode mixture layer 12 and the bonding strength between the electrode mixture layer 12 and the insulating layer 13 decreases.

The boiling point of the organic solvent is from 140 to 300 degrees C. When the boiling point of the organic solvent is lower than 140 degrees C., the insulating layer application liquid is easy to dry, so that the insulating layer application liquid is not able to sufficiently permeates into the void 15 of the electrode mixture layer 12 and the bonding strength between the electrode mixture layer 12 and the insulating layer 13 decreases. When the boiling point of the organic solvent is higher than 300 degrees C., the insulating layer application liquid is difficult to dry, so that the insulating layer application liquid excessively permeates into the void 15 of the electrode mixture layer 12 and the void ratio of the electrode mixture layer 12 decreases.

The content of the resin 21 in the insulating layer application liquid is preferably 10% by mass or less. When the content of the resin 21 in the insulating layer application liquid is 10% by mass or less, heat generation is reduced when the cathode and the anode are short-circuited. The content of the resin 21 in the insulating layer application liquid is typically 1% by mass or more.

The insulating layer application liquid may further contain a dispersion medium or the like, as necessary.

The dispersion medium is not particularly limited as long as it is capable of dispersing or dissolving the insulating inorganic particulate 16 and the resin 21 and can be appropriately selected. Examples thereof include, but are not limited to, water, hydrocarbon solvents, alcohol solvents, ketone solvents, ester solvents, ether solvents, 1-methyl-2-pyrrolidone, and dimethyl sulfoxide.

The insulating layer application liquid can be prepared by dispersing a composition containing the insulating inorganic particulate 16, the resin 21, and the organic solvent.

A disperser used for dispersing the composition is not particularly limited and may be appropriately selected. Examples thereof include, but are not limited to, a homogenizer, a stirrer, a bead mill, a planetary mixer, and a Hobart mixer.

The homogenizer may be of, for example, a high-speed rotary shear stirring system, a high-pressure jet dispersion system, an ultrasonic dispersion system, or a medium stirring mill system.

Method for Manufacturing Electrode

A method for manufacturing the electrode 10 includes the processes of forming the electrode mixture layer 12 on the electrode substrate 11 and applying the insulating layer application liquid of the present embodiment onto the electrode mixture layer 12 to form the insulating layer 13.

A method of applying the insulating layer application liquid is not particularly limited and may be appropriately selected. For example, a known printing method can be used. Among them, a droplet discharge method is preferable since a thin film can be formed with a small amount of the insulating layer application liquid.

Examples of the droplet discharging method include, but are not limited to, an inkjet method, a spray drying method, and a jet dispenser method.

Figure 3:
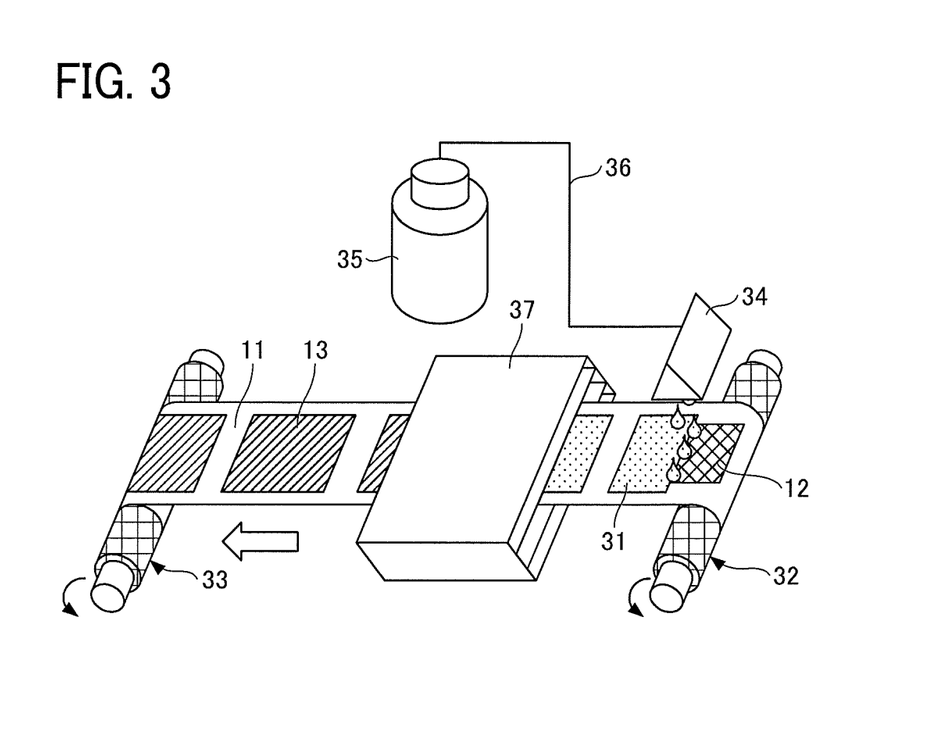
FIG. 3 is a schematic diagram illustrating a method for manufacturing the electrode illustrated in FIG. 1.

FIG. 3 is a schematic diagram illustrating a method for manufacturing the electrode 10.

The electrode 10 is manufactured by applying an insulating layer application liquid 31 onto the electrode substrate 11 on which the electrode mixture layer 12 is formed while conveying the electrode substrate 11.

Specifically, first, the electrode substrate 11 on which the electrode mixture layer 12 is formed in a predetermined region is wound around a cylindrical core and set on a feeding roller 32 and a reeling roller 33 so that the side on which the electrode mixture layer 12 is formed faces upward. In FIG. 3, the feeding roller 32 and the reeling roller 33 rotate counterclockwise, and the electrode substrate 11 is conveyed from the right to the left.

Next, a droplet discharge mechanism 34 discharges droplets of the insulating layer application liquid 31 onto the electrode mixture layer 12 on the electrode substrate 11 being conveyed. The droplet discharge mechanism 34 is disposed above the electrode substrate 11 between the feeding roller 32 and the reeling roller 33. The insulating layer application liquid 31 is supplied from a tank 35 to the droplet discharge mechanism 34 via a tube 36. The droplets of the insulating layer application liquid 31 are discharged so as to cover at least a part of the electrode mixture layer 12.

A plurality of droplet discharge mechanisms 34 may be provided in a direction substantially parallel to or substantially perpendicular to the direction of conveyance of the electrode substrate 11.

Next, the electrode substrate 11 covered with the insulating layer application liquid 31 is conveyed to a drying mechanism 37 by the feeding roller 32 and the reeling roller 33 and dried. As a result, the insulating layer 13 is formed on the electrode mixture layer 12.

The drying mechanism 37 is not particularly limited as long as it does not come into direct contact with the insulating layer application liquid 31 and may be appropriately selected. Examples thereof include, but are not limited to, a resistance heater, an infrared heater, and a fan heater.

The drying mechanism 37 may be disposed either above or below the electrode substrate 11.

A plurality of drying mechanisms 37 may be provided in a direction substantially parallel to the direction of conveyance of the electrode substrate 11.

Figure 4:
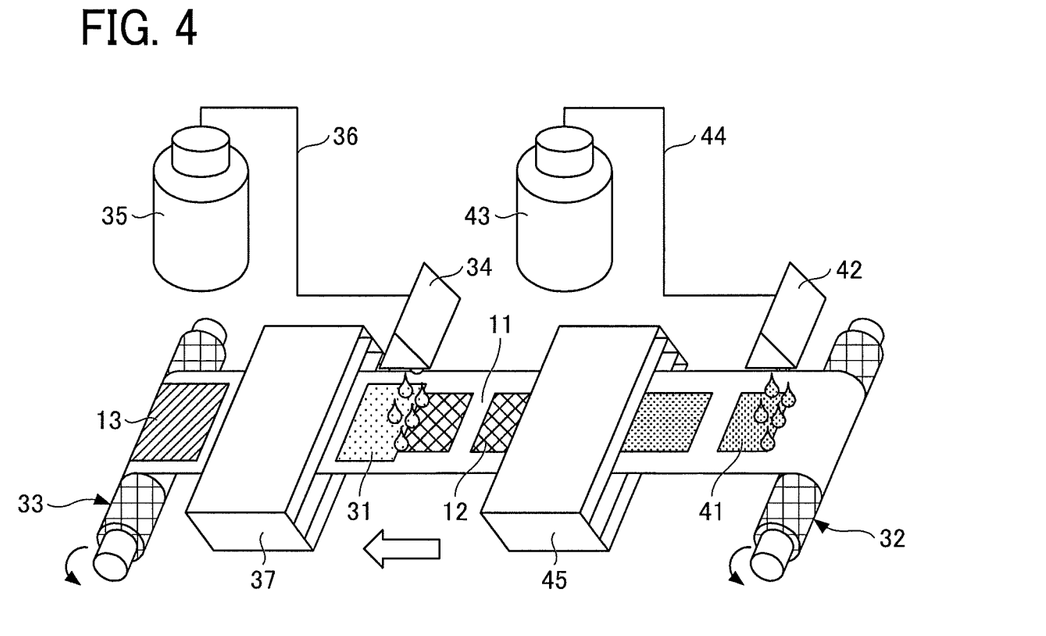
FIG. 4 is a schematic diagram illustrating another method for manufacturing the electrode illustrated in FIG. 1.

FIG. 4 is a schematic diagram illustrating another method for manufacturing the electrode 10.

The electrode 10 is manufactured in the same manner as in FIG. 3 except for applying an electrode mixture layer application liquid 41 onto the electrode substrate 11 while conveying the electrode substrate 11 before applying the insulating layer application liquid 31 onto the electrode substrate 11 on which the electrode mixture layer 12 is formed while conveying the electrode substrate 11.

Specifically, first, the electrode substrate 11 is wound around a cylindrical core and set on the feeding roller 32 and the reeling roller 33.

Next, a droplet discharge mechanism 42 discharges droplets of the electrode mixture layer application liquid 41 onto the electrode substrate 11 being conveyed. The droplet discharge mechanism 42 is disposed above the electrode substrate 11 between the feeding roller 32 and the droplet discharge mechanism 34. The electrode mixture layer application liquid 41 is supplied from a tank 43 to the droplet discharge mechanism 42 via a tube 44. The droplets of the electrode mixture layer application liquid 41 are discharged so as to cover a predetermined region of the electrode substrate 11.

The droplet discharge mechanism 42 may be replaced with a comma coater, a die coater, a gravure coater, a roll coater, or a doctor blade.

Next, the electrode substrate 11 covered with the electrode mixture layer application liquid 41 is conveyed to a drying mechanism 45 by the feeding roller 32 and the reeling roller 33 and dried. As a result, the electrode mixture layer 12 is formed on the electrode substrate 11.

The drying mechanism 45 is not particularly limited as long as it does not come into direct contact with the electrode mixture layer application liquid 41 and may be appropriately selected. Examples thereof include, but are not limited to, a resistance heater, an infrared heater, and a fan heater.

The drying mechanism 45 may be disposed either above or below the electrode substrate 11.

A plurality of drying mechanisms 45 may be provided in a direction substantially parallel to the direction of conveyance of the electrode substrate 11.

Next, in the same manner as in FIG. 3, the insulating layer 13 is formed on the electrode mixture layer 12.

Nonaqueous Power Storage Element

The nonaqueous power storage element according to an embodiment of the present invention includes the electrode according to an embodiment of the present invention. At this time, the electrode is either a cathode or an anode.

In the nonaqueous power storage element of the present embodiment, the cathode and the anode are disposed with a separator therebetween. Preferably, the cathode and the anode are laminated in an alternating manner with a separator therebetween. At this time, the number of laminated layers of the cathode and the anode can be arbitrarily determined.

The nonaqueous power storage element of the present embodiment is preferably injected with a nonaqueous electrolytic solution and sealed with an exterior. To insulate from the exterior, it is preferable that a separator is disposed between the exterior and the electrodes on both sides.

The nonaqueous power storage element is not particularly limited and may be appropriately selected according to the purpose. Examples thereof include, but are not limited to, a nonaqueous secondary battery and a nonaqueous capacitor.

The shape of the nonaqueous power storage element is not particularly limited and may be appropriately selected from among known shapes according to the use thereof. For example, the shape of the nonaqueous power storage element may be of a laminate type, a cylinder type in which a sheet electrode and a separator are spirally assembled, another cylinder type in which a pellet electrode and a separator are combined into an inside-out structure, or a coin type in which a pellet electrode and a separator are laminated.

Figure 5:
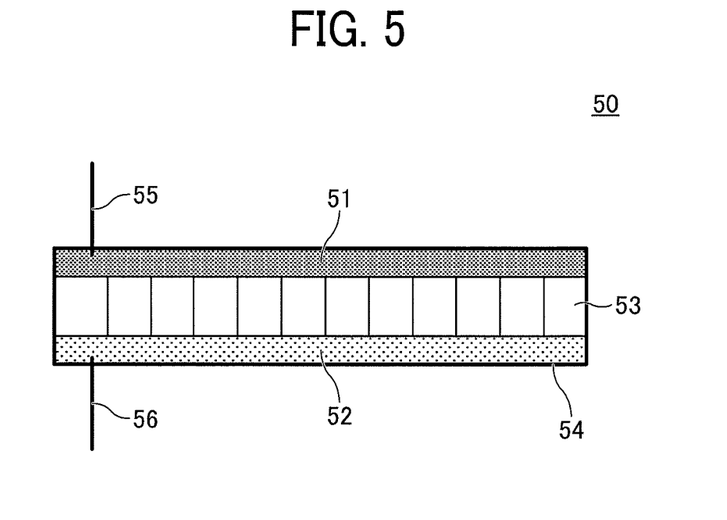
FIG. 5 is a schematic view of a nonaqueous power storage element according to an embodiment of the present invention.

FIG. 5 is a schematic view of the nonaqueous power storage element according to an embodiment of the present invention.

A nonaqueous power storage element 50 includes a cathode 51, an anode 52, a separator 53 holding a nonaqueous electrolytic solution, an exterior can 54, a lead wire 55 of the cathode 51, and a lead wire 56 of the anode 52.

Separator

The separator is provided between the anode and the cathode to prevent a short circuit between the anode and the cathode.

The separator has ion permeability and does not have electron conductivity.

The separator is not particularly limited and may be appropriately selected according to the purpose. Examples thereof include, but are not limited to, papers such as Kraft paper, vinylon mixed paper, and synthetic pulp mixed paper, cellophane, polyethylene grafted films, polyolefin unwoven fabrics such as polypropylene melt-flow unwoven fabric, polyamide unwoven fabrics, glass fiber unwoven fabrics, polyethylene microporous membranes, and polypropylene microporous membranes.

For holding the nonaqueous electrolytic solution, the separator preferably has a porosity of 50% or more.

The average thickness of the separator is preferably from 3 to 50 µm, and more preferably from 5 to 30 µm. When the average thickness of the separator is 3 µm or more, it is easy to prevent a short circuit between the anode and the cathode. When the average thickness is 50 µm or less, the electrical resistance between the anode and the cathode is less likely to increase.

The shape of the separator is not particularly limited as long as it can be applied to the nonaqueous power storage element and can be appropriately selected. For example, the shape may be a sheet-like shape.

The size of the separator is not particularly limited as long as it can be applied to the nonaqueous power storage element and can be appropriately selected according to the purpose.

The separator may have either a single-layer structure or a multi-layer structure.

Nonaqueous Electrolytic Solution

The nonaqueous electrolytic solution refers to an electrolytic solution in which an electrolyte salt is dissolved in a nonaqueous solvent.

Nonaqueous Solvent

The nonaqueous solvent is not particularly limited and may be appropriately selected depending on the purpose, but an aprotic organic solvent is preferable.

Examples of the aprotic organic solvent include, but are not limited to, a carbonate-based organic solvent such as chain carbonates and cyclic carbonates.

Examples of the chain carbonates include, but are not limited to, dimethyl carbonate (DMC), diethyl carbonate (DEC), methyl ethyl carbonate (EMC), and methyl propionate (MP).

Examples of the cyclic carbonates include, but are not limited to, propylene carbonate (PC), ethylene carbonate (EC), butylene carbonate (BC), and vinylene carbonate (VC).

Among these, ethylene carbonate (EC) and dimethyl carbonate (DMC) are preferably used in combination. At this time, the mixing ratio between ethylene carbonate (EC) and dimethyl carbonate (DMC) is not particularly limited and can be appropriately selected according to the purpose.

In the present embodiment, a nonaqueous solvent other than the carbonate-based organic solvent may be used, if necessary.

Examples of the nonaqueous solvent other than the carbonate-based organic solvent include, but are not limited to, ester-based organic solvents such as cyclic esters and chain esters, and ether-based organic solvents such as cyclic ethers and chain ethers.

Specific examples of the cyclic esters include, but are not limited to, γ-butyrolactone (γ-BL), 2-methyl-γ-butyrolactone, acetyl-γ-butyrolactone, and γ-valerolactone.

Specific examples of the chain esters include, but are not limited to, propionic acid alkyl esters, malonic acid dialkyl esters, acetic acid alkyl esters (e.g., methyl acetate (MA), ethyl acetate), and formic acid alkyl esters (e.g., methyl formate (MF), ethyl formate).

Specific examples of the cyclic ethers include, but are not limited to, tetrahydrofuran, alkyltetrahydrofuran, alkoxytetrahydrofuran, dialkoxytetrahydrofuran, 1,3-dioxolan, alkyl-1,3-dioxolan, and 1,4-dioxolan.

Specific examples of the chain ethers include, but are not limited to, 1,2-dimethoxyethane (DME), diethyl ether, ethylene glycol dialkyl ethers, diethylene glycol dialkyl ethers, triethylene glycol dialkyl ethers, and tetraethylene glycol dialkyl ethers.

Electrolyte Salt

The electrolyte salt is not particularly limited as long as it has high ion conductivity and is soluble in a nonaqueous solvent. Preferred examples thereof include a lithium salt.

The lithium salt is not particularly limited and can be appropriately selected according to the purpose. Examples thereof include, but are not limited to, lithium hexafluorophosphate ($LiPF_6$), lithium perchlorate ($LiClO_4$), lithium chloride (LiCl), lithium tetrafluoroborate ($LiBF_4$), lithium hexafluoroarsenate ($LiAsF_6$), lithium trifluoromethanesulfonate ($LiCF_3SO_3$), lithium bis(trifluoromethylsulfonyl)imide ($LiN(CF_3SO_2)_2$), and lithium bis(perfluoroethylsulfonyl)imide ($LiN(C_2F_5SO_2)_2$). Among these, $LiPF_6$ is particularly preferable in view of the occlusion amount of anions in the carbon electrode.

Each of these electrolyte salts may be used alone or in combination with others.

The content of the electrolyte salt in the nonaqueous electrolytic solution is not particularly limited and may be appropriately selected according to the purpose, but is preferably from 0.7 to 4 mol/L, more preferably from 1.0 to 3 mol/L, and most preferably from 1.0 to 2.5 mol/L.

Electronic Device

The electronic device according to an embodiment of the present invention includes the nonaqueous power storage element according to an embodiment of the present invention.

The electronic device is not particularly limited in application and can be used for various purposes. For example, the electronic device may be used for laptop computers, pen input personal computers, mobile personal computers, electronic book players, cellular phones, portable facsimile machines, portable copiers, portable printers, headphone stereos, video movie recorders, liquid crystal display televisions, handy cleaners, portable CD players, mini disk players, transceivers, electronic organizers, calculators, memory cards, portable tape recorders, radios, backup power sources, motors, illumination apparatuses, toys, game machines, clocks, electronic flashes, and cameras.

EXAMPLES

Further understanding can be obtained by reference to certain specific examples which are provided herein for the purpose of illustration only and are not intended to be limiting.

The viscosity of the insulating layer application liquids prepared in the following examples and the average particle diameter of the insulating inorganic particulates in the insulating layer application liquids were measured by the following method.

Viscosity

The viscosity of each insulating layer application liquid was measured at 25 degrees C. using an E-type viscometer equipped with a rotor CPA-40Z at 100 rpm.

Average Particle Diameter of Insulating Inorganic Particulate

The average particle diameter of the insulating inorganic particulate in each insulating layer application liquid was measured using a laser diffraction particle size analysis instrument MASTERSIZER 3000E (available from Malvern Panalytical Ltd.).

Example 1

Preparation of Insulating Layer Application Liquid

An alumina particulate AA-05 (available from Sumitomo Chemical Co., Ltd.) as an insulating inorganic particulate, an acrylic resin AZ9129 (available from Zeon Corporation) as a first resin, MALIALIM HKM-50A (available from NOF CORPORATION) as a second resin, isopropyl glycol (boiling point: 141 degrees C.) as an organic solvent, and ion-exchange water as a dispersion medium were used.

The insulating inorganic particulate, the second resin, and a part of the dispersion medium were dispersed using a stirrer, and the first resin was thereafter added and dispersed using a homogenizer G-SMASHER (available from RIX CORPORATION), thus preparing a dispersion liquid containing 60% by mass of the insulating inorganic particulate. Next, the organic solvent and the remainder of the dispersion medium were added and dispersed using an ultrasonic disperser UH-150 (available from SMT Corporation), thus preparing an insulating layer application liquid.

The insulating layer application liquid was composed of 20% by mass of the insulating inorganic particulate, 0.3% by mass of the first resin, 0.2% by mass of the second resin, 30% by mass of the organic solvent, and 49.5% by mass of the dispersion medium. The viscosity of the insulating layer application liquid was 3.1 mPa·s and the average particle diameter of the insulating inorganic particulate was about 0.64 μm.

Preparation of Anode Mixture Layer Application Liquid

Carbons ALM900 (available from Mitsubishi Corporation) and ALM400 (available from Mitsubishi Corporation) as anode active materials and a conducting agent were dispersed in water to prepare an anode mixture layer application liquid having a solid content concentration of 60% by mass.

Preparation of Cathode Mixture Layer Application Liquid

A lithium-nickel cobalt aluminum composite oxide particulate NCA 503H (available from JFE MINERAL COMPANY, LTD.) as a cathode active material and a conducting agent were dispersed in N-methyl-2-pyrrolidone to prepare a cathode mixture layer application liquid having a solid content concentration of 77% by mass.

Preparation of Anode

An anode was prepared by the electrode manufacturing method illustrated in FIG. 4. Specifically, droplets of the anode mixture layer application liquid were discharged onto a predetermined region on one side of a copper current collector foil, followed by drying, to form an anode mixture layer. At this time, droplets of the anode mixture layer application liquid were discharged so that the mass per unit area (i.e., area density) of the anode mixture layer was about 17 mg/cm$^2$. Next, droplets of the insulating layer application liquid were discharged onto the anode mixture layer and then dried to form an insulating layer. At this time, droplets of the insulating layer application liquid were discharged so that the mass per unit area (i.e., area density) of the insulating layer was about 1.96 mg/cm$^2$. Next, in the same manner as described above, an anode mixture layer and an insulating layer were formed on the other side of the copper current collector foil. For the droplet discharge mechanisms 34 and 42, an industrial inkjet head MH2420 (available from Ricoh Company, Ltd.) was used.

Next, the anode mixture layer and the insulating layer were press-cut into a shape having sides of 50 mm×30 mm, with a lead wire (copper current collector foil) remained, thus preparing an anode.

As a result of observing a cross section of the anode with a scanning electron microscope, it was found that a part of the insulating layer was present in a part of the void of the anode mixture layer, and that the thickness of the insulating layer, that is, the distance from the surface of the anode mixture layer to the surface of the insulating layer, was 11.3 μm.

Preparation of Cathode

The procedure in "Preparation of Anode" was repeated except that the copper current collector foil was replaced with an aluminum current collector foil and the anode mixture layer application liquid was replaced with the cathode mixture layer application liquid. Thus, a cathode mixture layer and an insulating layer were formed on both sides of the aluminum current collector foil. At this time, droplets of the cathode mixture layer application liquid were discharged so that the mass per unit area (i.e., area density) of the cathode mixture layer was about 28 mg/cm$^2$.

Next, the cathode mixture layer and the insulating layer were press-cut into a shape having sides of 43 mm×29 mm, with a lead wire (aluminum current collector foil) remained, thus preparing a cathode.

As a result of observing a cross section of the cathode with a scanning electron microscope, it was found that a part of the insulating layer was present in a part of the void of the cathode mixture layer, and that the thickness of the insulating layer, that is, the distance from the surface of the cathode mixture layer to the surface of the insulating layer, was 11.3 μm.

Preparation of Nonaqueous Electrolytic Solution

Lithium hexafluorophosphate (LiPF$_6$) and lithium tetrafluoroborate (LiBF$_4$) were dissolved in ethylene carbonate to prepare a nonaqueous electrolytic solution.

Preparation of Lithium Ion Secondary Battery

Ten sheets of the cathode and eleven sheets of the anode were alternately laminated with a separator interposed therebetween, with the lead wires not overlapping. As the separator, a composite material of a microporous polypropylene membrane and a microporous polyethylene membrane, having a thickness of 15 μm, was used. Next, a bag-shaped exterior was formed by a laminate seal, and the nonaqueous electrolytic solution was injected into the exterior and the pouring portion was sealed. Thus, a lithium ion secondary battery was prepared.

Comparative Example 1

A lithium ion secondary battery was prepared in the same manner as in Example 1 except that no insulating layer was formed in the cathode and the anode.

Nail Penetration Test

The lithium ion secondary batteries of Example 1 and Comparative Example 1 were subjected to a nail penetration test. Specifically, each of the lithium ion secondary batteries in a fully charged state (SOC (state of charge) 100%) was pierced with a nail having a diameter of 4.5 mm in parallel to the direction of lamination of the electrodes to be intentionally short-circuited, and the temperature of the nail was measured. As a result, the temperature rose to 81.9 degrees C. in the lithium ion secondary battery of Example 1, whereas the temperature rose to 152.5 degrees C. in the lithium ion secondary battery of Comparative Example 1. From the above results, it is considered that the lithium ion secondary battery of Example 1 is able to suppress heat generation when the cathode and the anode are short-circuited.

Example 2

An insulating layer application liquid was prepared in the same manner as in Example 1 except that propylene glycol (boiling point: 188.2 degrees C.) was used as the organic solvent, MEGAFACE F-444 (available from DIC Corporation) was further added as a third resin when the organic solvent and the remainder of the dispersion medium were added, and the addition amount of each component was adjusted.

The insulating layer application liquid was composed of 35% by mass of the insulating inorganic particulate, 0.525% by mass of the first resin, 0.35% by mass of the second resin, 35% by mass of the organic solvent, 0.1% by mass of the third resin, and 29.025% by mass of the dispersion medium. The viscosity of the insulating layer application liquid was 11.2 mPa·s and the average particle diameter of the insulating inorganic particulate was about 0.56 μm.

Example 3

An insulating layer application liquid was prepared in the same manner as in Example 2 except that a dispersion liquid containing 64% by mass of an inorganic particulate was prepared using an alumina particulate AKP-3000 (available from Sumitomo Chemical Co., Ltd.) as the insulating inorganic particulate and a fluorine acrylic resin TRD-202A (available from JSR Corporation) as the first resin and adjusting the addition amount of each component.

The insulating layer application liquid was composed of 35% by mass of the insulating inorganic particulate, 0.525% by mass of the first resin, 0.875% by mass of the second resin, 30% by mass of the organic solvent, 0.61% by mass of the third resin, and 33.44% by mass of the dispersion medium. The viscosity of the insulating layer application liquid was 12.3 mPa·s and the average particle diameter of the insulating inorganic particulate was about 0.45 μm.

Example 4

An insulating layer application liquid was prepared in the same manner as in Example 2 except that glycerin (boiling point: 290 degrees C.) was used as the organic solvent.

The insulating layer application liquid was composed of 35% by mass of the insulating inorganic particulate, 0.525% by mass of the first resin, 0.35% by mass of the second resin, 35% by mass of the organic solvent, 0.1% by mass of the third resin, and 29.025% by mass of the dispersion medium. The viscosity of the insulating layer application liquid was 17.4 mPa·s and the average particle diameter of the insulating inorganic particulate was equivalent to those of Examples 1 to 3.

Example 5

An insulating layer application liquid was prepared in the same manner as in Example 3 except that glycerin (boiling point: 290 degrees C.) was used as the organic solvent and the addition amount of each component was adjusted.

The insulating layer application liquid was composed of 35% by mass of the insulating inorganic particulate, 0.525% by mass of the first resin, 0.875% by mass of the second resin, 30% by mass of the organic solvent, 0.61% by mass of the third resin, and 33.44% by mass of the dispersion medium. The viscosity of the insulating layer application liquid was 18.1 mPa·s and the average particle diameter of the insulating inorganic particulate was equivalent to those of Examples 1 to 3.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrode, comprising:
   an electrode substrate;
   an electrode mixture layer overlying the electrode substrate, the electrode mixture layer containing an active material and a void;
   an insulating layer having a thickness of 0.3 to 20 μm overlying the electrode mixture layer, the insulating layer containing:
      a resin accounting for 0.1% to 10% by mass of the insulating layer, and
      an insulating inorganic particulate accounting for 80% by mass or more of the insulating layer,
      wherein the insulating layer does not contain the active material,
   and wherein the electrode mixture layer does not contain the resin or insulating inorganic particulate,
   and a boundary region of the electrode mixture layer with the insulting layer,
   wherein the boundary region comprises (i) the active material, and
   (ii) the resin and the insulating inorganic particulate which are present in a part of the void.

2. The electrode of claim 1, wherein the insulating inorganic particulate comprises at least one member selected from the group consisting of a metal oxide, a metal nitride, a metal compound other than the metal oxide and the metal nitride, and glass ceramic.

3. The electrode of claim 1, wherein the the insulating layer consists of one or more of the resins and one or more of the insulating inorganic particulates.

4. A nonaqueous power storage element comprising the electrode of claim 1.

5. An electronic device comprising the nonaqueous power storage element of claim 4.

6. The electrode of claim 1, wherein the insulating inorganic particulate accounts for 80% to 99% by mass of the insulating layer.

7. The electrode of claim 1, wherein the electrode mixture layer is an anode mixture layer having a thickness of 10 to 450 μm.

8. The electrode of claim 1, wherein the electrode mixture layer is a cathode mixture layer having a thickness of 10 to 300 μm.

9. The electrode of claim 1, wherein the insulating inorganic particulate comprises alumina.

10. The electrode of claim 1, wherein an average particle diameter of the insulating inorganic particulate is 3 μm or less.

11. The electrode of claim 1, wherein the resin comprises an acrylic resin.

12. The electrode of claim 9, wherein an average particle diameter of the insulating inorganic particulate is 3 μm or less.

13. The electrode of claim 12, wherein the resin comprises an acrylic resin.

14. A method for manufacturing the electrode of claim 1, comprising:
   forming the electrode mixture layer on the electrode substrate, the electrode mixture layer containing the active material and the void; and
   applying an insulating layer application liquid onto the electrode mixture layer to form the insulating layer,
   wherein the insulating layer application liquid comprises the insulating inorganic particulate accounting for 20% to 60% by mass of the insulating layer application liquid;
   the resin; and
   an organic solvent having a boiling point of from 140 to 300 degrees C.,
   wherein the insulating layer application liquid has a viscosity of from 5 to 20 mPa·s at 25 degrees C.

15. The method of claim 14, wherein the resin accounts for 10% by mass or less of the insulating layer application liquid.

16. The method of claim 14, wherein the applying includes discharging droplets of the insulating layer application liquid.

17. The method of claim 14, wherein the applying includes conveying the electrode substrate having the electrode mixture layer thereon.

18. The method of claim 14, wherein the forming includes conveying the electrode substrate.

* * * * *